(12) United States Patent
Mansur et al.

(10) Patent No.: US 9,098,557 B2
(45) Date of Patent: Aug. 4, 2015

(54) APPLICATION ACCELERATOR

(71) Applicant: BMC Software, Inc., Houston, TX (US)

(72) Inventors: Bruce H. Mansur, Dripping Springs, TX (US); David A. Smith, Katy, TX (US); Gary L. Salazar, Richmond, TX (US); Robert W. Sablotne, Leander, TX (US); Rupak R. Devroy, Katy, TX (US)

(73) Assignee: BMC SOFTWARE, INC., Houston, TX (US)

( * ) Notice: Subject to any disclaimer, the term of this patent is extended or adjusted under 35 U.S.C. 154(b) by 323 days.

(21) Appl. No.: 13/789,542

(22) Filed: Mar. 7, 2013

(65) Prior Publication Data

US 2014/0258335 A1    Sep. 11, 2014

(51) Int. Cl.
*G06F 17/30* (2006.01)
*G06F 9/44* (2006.01)
*G06F 9/50* (2006.01)

(52) U.S. Cl.
CPC ............ *G06F 17/3056* (2013.01); *G06F 9/44* (2013.01); *G06F 9/50* (2013.01)

(58) Field of Classification Search
CPC .............. G06F 17/30589; G06F 9/466; G06F 17/30563; G06F 8/20; G06F 8/51; G06F 17/30; G06F 17/30557; G06F 9/44; G06F 9/50; G06F 17/3056
USPC .......................................................... 707/782
See application file for complete search history.

(56) References Cited

U.S. PATENT DOCUMENTS

| 5,155,678 | A | * | 10/1992 | Fukumoto et al. | 707/610 |
|---|---|---|---|---|---|
| 5,546,050 | A | * | 8/1996 | Florian et al. | 330/282 |
| 6,691,121 | B1 | * | 2/2004 | Heronimus et al. | 1/1 |
| 7,076,782 | B2 | * | 7/2006 | Smith | 718/104 |
| 7,685,122 | B1 | * | 3/2010 | Lubrano | 707/999.008 |
| 2006/0031251 | A1 | * | 2/2006 | Blackman et al. | 707/103 Y |

* cited by examiner

*Primary Examiner* — Debbie Le
(74) *Attorney, Agent, or Firm* — Brake Hughes Bellermann LLP (57) ABSTRACT

A method includes providing an application accelerator to an IMS region controller, which is coupled to an IMS data language interpreter (DL/I) interface. The IMS DL/I interface provides standard data access paths to a user application launched in an IMS environment. The application accelerator is configured to make alternate data access paths available to the user application in addition to the standard data access paths provided by the IMS environment. The method further includes intercepting an IMS DL/I call made by the user application and determining whether the intercepted call should be processed by the IMS DL/I interface or by an I/O engine of the application accelerator.

20 Claims, 11 Drawing Sheets

FIG. 6 providing an application accelerator to an IMS region controller coupled to an IMS data language interpreter (DL/I) interface, the IMS DL/I interface providing standard data access paths to a user application launched in an IMS environment, and the application accelerator configured to make alternate data access paths available to the user application in addition to the standard data access paths provided by the IMS environment
710 intercepting an IMS DL/I call made by the user application
720 determining whether the intercepted call should be processed by the IMS DL/I interface or by an I/O engine of the application accelerator
730 receiving the intercepted call by the I/O engine of the application accelerator, and directly accessing a database, bypassing the IMS DL/I interface, by the I/O engine to process the intercepted call
740 disengaging the application accelerator from processing further user application calls if the intercepted call is of an unsupported call type
750

APPLICATION ACCELERATOR

TECHNICAL FIELD

This description relates to management of computer databases.

BACKGROUND

Database management systems (DBMS) control access and recovery of data that is stored, for example, in remote databases. The database management systems may be based on the notion that application code should be separated from data control and data by an interface (e.g., by a Data Language/Interface (DL/I)). Such database management systems can allow application programs to access and navigate through the data by using a standard DL/I callable interface. Multiple applications can access and update a single instance of data through the interface, thus providing current data for each application. There is no need to make redundant copies of the data. Online access to data also becomes easier because the application code is separated from data control. Application code can focus on the manipulation of data without the complications and overhead associated with the access and recovery of data.

A widely deployed database management system using a DL/I interface is IBM's Information Management System (IMS). IMS application programs are typically static processes that have to interface with dynamic data stores (IMS databases) that can oscillate from being freshly reorganized to being highly disorganized. The IMS DL/I application programs have to be fine tuned or altered depending on the state of the IMS databases. Unfortunately, in most environments, the effort needed to customize IMS DL/I applications to respond to changes in the databases can be prohibitive in cost and/or the labor required. In common implementations, the IMS DL/I applications are tuned only for a specific state of an IMS database and suffer poor performance when the IMS database is a different state.

Consideration is now being given to implementations of IMS DL/I application for data stores that have dynamic states.

SUMMARY

The details of one or more implementations are set forth in the accompanying drawings and the description below. Other features will be apparent from the description and drawings, and from the claims.

DETAILED DESCRIPTION

An application may interact with a database through a standard data language interpreter interface. In accordance with the principles of the disclosure herein, a database access engine or application accelerator is deployed to manage interactions of the application with the database via access paths through or in addition to the standard data language interpreter interface.

For convenience in description, the application accelerator is described herein in the context of "IMS" applications developed for the widely-deployed Information Management System (IMS), in which application code is separated from the data by a data language interpreter (DL/I) interface.

IMS uses defined regions to perform its functions. The following regions are typically defined in using IMS:

Control region—The main IMS region. It owns all of the databases that IMS transactions access and is responsible for all communications with the databases. It runs continuously and oversees the operation of other dependent regions.

Message processing region (MPR)—A dependent region used for processing messages.

Batch message processing (BMP) region—A dependent region used for processing batch operations.

IMS may be supported by a computing platform/operating system (e.g., Multiple Virtual Storage (MVS) operating system) that includes one or more physical or virtual computing machines, which may be linked or networked with each other and with one or more databases. Applications (e.g., payroll, accounts receivable, transaction processing, database management applications) hosted on the computing platform may be coded to access data in the one or more databases via IMS's standard DL/I interface. IMS may be implemented in different system configurations that allow hosted applications to access the data in the databases in correspondingly different modes (batch processing, batch message processing (BMP), etc.). Different versions of the application accelerators of the present disclosure may facilitate application-database interactions for the hosted applications in the different IMS configurations.

Example implementations of the application accelerators for IMS applications with two different data access modes—batch processing and batch message processing (BMP), are described below.

The application accelerator may be configured to dynamically gather data in the execution of IMS DL/I batch applications (e.g., DL/I DBB and BMP applications), analyze application performance, and accordingly recommend and adjust or change the execution environment. The recommended adjustments or changes to the IMS DL/I application execution environments may, for example, include altering buffers sizes and/or a number of buffers allocated based on actual IMS database access calls and buffer hit ratios. The recommended adjustments or changes to the IMS DL/I application execution environments may, alternatively or additionally, involve dynamic use of alternative buffering techniques, (e.g., OSAM Sequential buffering).

Use of the database access engine/application accelerator of the present disclosure to replace the traditional IMS database access paths through the IMS DL/I interface may be expected to reduce CPU demand and elapsed times in many situations.

IMS BATCH DL/I Application

Figure 1:
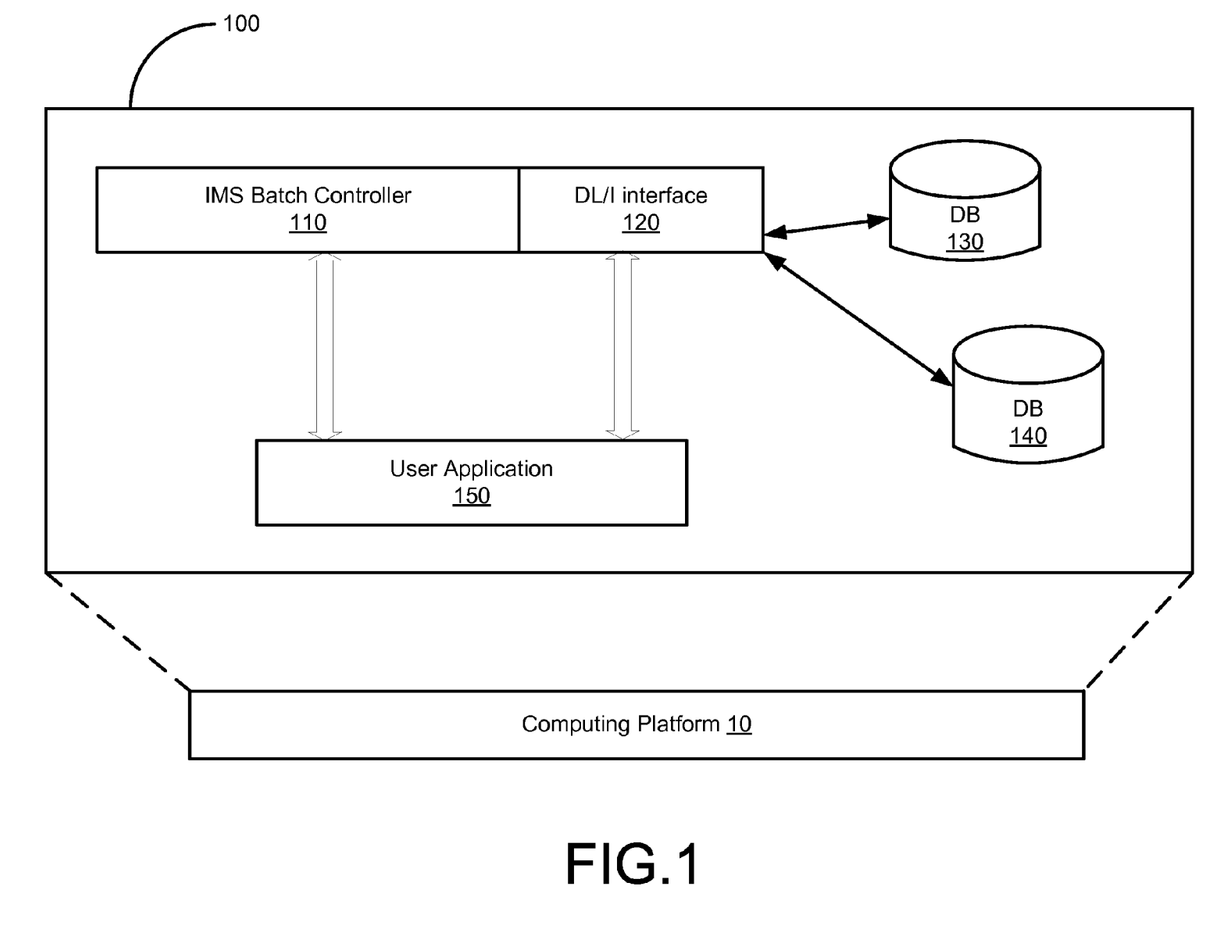
FIG. 1 is a block diagram illustrating a conventional IMS arrangement hosted on a computing platform (e.g., a MVS environment) for batch processing of data.

FIG. 1 shows a conventional IMS arrangement 100 hosted on a computing platform 10 (e.g., a MVS environment) for batch processing of data. Computing platform 10 may be supported by one or more stand alone or networked computers (e.g., mainframe computers, servers, client devices, personal computers, mobile devices, etc.). IMS arrangement 100 includes an IMS batch region controller 110 with a DL/I interface 120 linked to IMS databases (e.g., databases 130 and 140). A user application 150, which may hosted on MVS computing platform 10, may be coded for batch processing of data stored in the databases (e.g., databases 130 and 140).

When user application 150 is launched on platform 10, a job step may specify DL/I processing (e.g., in job control language (JCL)). In response, MVS may pass control (e.g., via a Supervisor Call (SVC)) to IMS batch region controller 110, which may create an IMS environment in address space. IMS may pass control to user application 150, which upon receiving control may initialize and begin processing. When user application 150 makes a data access request (i.e., a DL/I call to read/write an IMS database) control may be passed back to IMS. DL/I interface 120 may receive the data access request, access the appropriate database, and perform the necessary tasks associated with the data access request. Upon completion of the request, data and/or call status information may be returned by DL/I interface 120 to user application 150 for further processing.

User application 150 may make repeated data access requests for tasks in a batch job. User application 150 may then terminate and pass control back to the IMS batch region controller 110. IMS batch region controller 110 may then terminate the IMS environment as the batch job completes.

IMS BATCH DL/I Application with Application Accelerator

Figure 2:
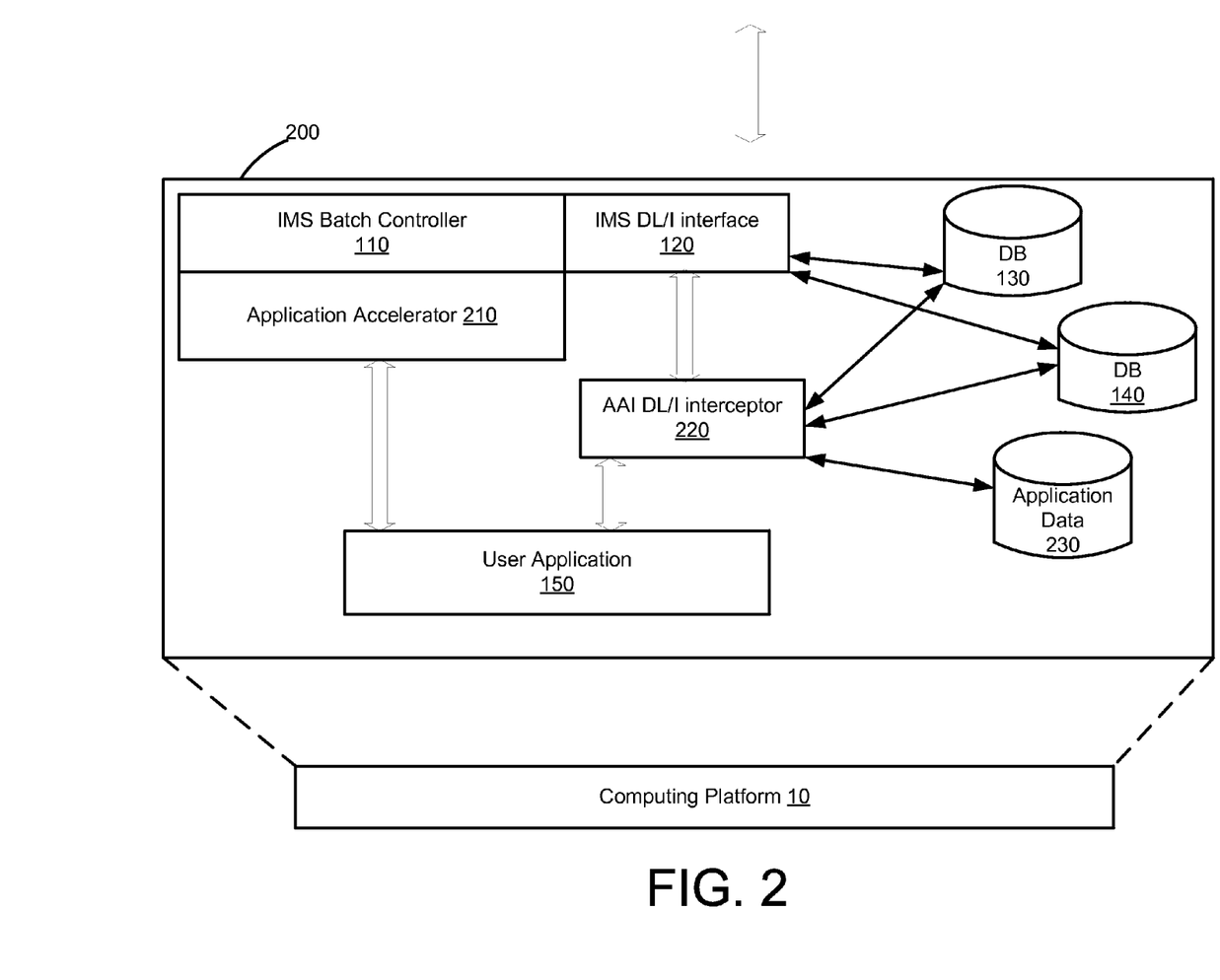
FIG. 2 is a block diagram illustrating an IMS arrangement which includes a specialized batch region controller or database access engine (e.g., Application Accelerator for IMS), in accordance with the principles of the disclosure herein.

FIG. 2 shows an IMS arrangement 200, which in addition to the components of IMS arrangement 100 includes a specialized batch region controller or database access engine (e.g., Application Accelerator for IMS (AAI) 210), in accordance with the principles of the disclosure herein. The specialized batch region controller or database access engine is configured to make alternate data access paths available to an IMS application (e.g., user application 150) in addition to the standard IMS DL/I data access paths, The specialized batch region controller may be configured to self-determine if it should be involved in processing IMS DL/I calls made by the IMS application and accordingly install a call interceptor module if appropriate. The call interceptor may get control, gather data, intercept and potentially redirect the IMS DL/I calls made by the IMS application around the standard IMS DL/I data access paths. Each intercepted DL/I call may be examined to determine processing compatibility with the specialized batch region controller/call interceptor. If the specialized batch region controller/call interceptor encounters an incompatible call, it may initiate processes to dynamically disengage. The dynamic disengagement processes may involve restoring IMS DL/I processing conditions to a position before the incompatible call was made, and passing the incompatible DL/I call and all further calls of the same type to the standard IMS DL/I access paths for processing.

At IMS shutdown, the specialized batch region controller's call interceptor may get control, save runtime data gathered on the job step processed, terminate, and pass control to IMS for termination.

With reference to IMS arrangement 200 in FIG. 2, AAI 210 may be initialized on an IBM MVS image (e.g., computing platform 10) as a dynamic front-end to IMS batch region controller 110. A job step in application 150 may specify DL/I processing in the JCL. In response, MVS, as in arrangement 100 (FIG. 1), may intend to pass control to IMS batch region controller 110, which here has AAI 210 as a front-end. AAI 210 may be configured to evaluate the job step and data (e.g., application data, call pattern data, etc. stored in application database 230) to determine whether the alternate or additional data access paths around or bypassing IMS DL/I 120 would, for example, be beneficial or appropriate for application processing of the job step. AAI 210 may be configured to accordingly install an AAI DL/I intercept component 220 for the alternate or additional data access paths. AAI DL/I intercept component 220 may also be referred to, in the description herein, as the AAI enhanced I/O engine. The alternate or additional data access paths may be optimized to improve user application 150's access to IMS databases (e.g., databases 130 and 140).

Then, as in arrangement 100, MVS may pass control to IMS batch region controller 110, which may create an IMS environment in address space. Further, IMS may pass control to user application 150, which upon receiving control may initialize and begins processing. However, in contrast to arrangement 100, in arrangement 200 when user application 150 makes a data access request (i.e., a DL/I call to read/write an IMS database) control may be passed to AAI DL/I intercept component 220 instead of DL/I interface 120. AAI 210 may be configured to evaluate and determine which component should optimally process the DL/I call—AAI DL/I intercept component 220 or IMS DL/I interface 120.

In the instance IMS DL/I interface 120 should process the call, AAI DL/I intercept component 220 may pass control to IMS DL/I interface 120. IMS DL/I interface 120, as in arrangement 100, may receive the data access request, access the appropriate database, and perform the necessary tasks associated with the data access request. Here, however, upon completion of the request, data results and/or call status information may be returned by IMS DL/I interface 120 to AAI DL/I intercept component 220 instead of directly to application 150.

AAI 210 may monitor the data results and/or call status information returned by IMS DL/I interface 120 to AAI DL/I intercept component 220 before passing the data results and/or call status information to user application 150 for further processing. AAI 210 may also store the data results and/or call status information in application data base 230 for further analysis.

In the instance AAI DL/I intercept component 220 should process the call, AAI DL/I intercept component 220 may retain control, receive the data access request, access the appropriate database, and perform the necessary tasks associated with the data access request bypassing IMS DL/I interface 120. AAI 210 may monitor the data results and/or call status information. Upon completion of the request, data results and/or call status information may be returned to user application 150 for further processing. AAI 210 may also store the data results and/or call status information in application data base 240 for further analysis.

As in arrangement 100 (FIG. 1), in arrangement 200 user application 150 may make repeated data access requests to complete tasks in a batch job. User application 150 may then terminate and attempt to pass control back to the IMS batch region controller 110 via AAI DL/I intercept component 220. Accordingly, AAI DL/I intercept component 220 may complete its processing and release its resources (as shown for example, in FIG. 3E) before returning control to IMS batch region controller 110, which may terminate the IMS environment as the batch job completes.

It will be understood that the example specialized batch region controller or database access engine (e.g., AAI 210) shown and described with reference to FIG. 2 in the foregoing, may not completely replace or supplant the standard IMS DL/I data access paths (e.g. via IMS Dl/I 120) available to an IMS application (e.g., user application 150). AAI 210 may perform analysis to determine whether the alternate or additional data access paths around IMS DL/I 120 would, for example, be beneficial or appropriate for application processing. The analysis may be performed automatically and/or continuously by AAI 210 using data gathered by monitoring the data results and/or call status information that is returned to user application 150 by either AAI DL/I intercept component 220 or IMS DL/I 120 (which data and information may, for example, be stored in database 230 in arrangement 200).

Further, there may be certain application DL/I call types that are not supported by AAI DL/I intercept component 220. AAI 210/AAI DL/I intercept component 220 may be built with fault tolerance to accommodate changes in user application 150, which, for example, may introduce an unsupported call type. In response to encountering an unsupported call, AAI 210/AAI DL/I intercept component 220 may be configured to dynamically disengage and re-establish the standard IMS DL/I access paths through IMS DL/I 120 for processing the unsupported call with no interruption in or impact on the results of user application 150.

FIGS. 3A-3E are flowcharts which show example methods for implementing or using AAI 210 and its functions in an MVS/IMS environment, in accordance with the principles of the disclosure herein.

Figure 3A:
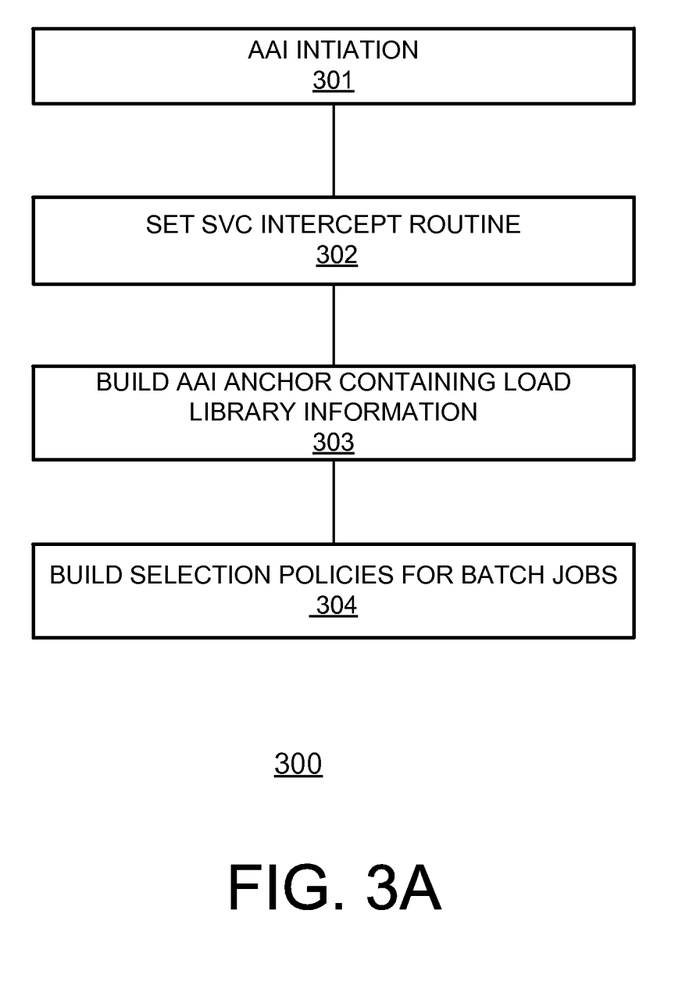
FIGS. 3A-3E are flowcharts illustrating example methods for implementing or using an application accelerator and its functions in an MVS/IMS environment, in accordance with the principles of the disclosure herein.

FIG. 3A shows an example method 300 for installing AAI 210 as a front end to an IMS batch region controller in an MVS/IMS environment (e.g., in arrangement 200). Method 300 includes AAI initiation (301) and setting up an SVC intercept routine (302). The method further includes building an AAI anchor containing load library information (303) and building selection policies for batch jobs (304).

Figure 3B:
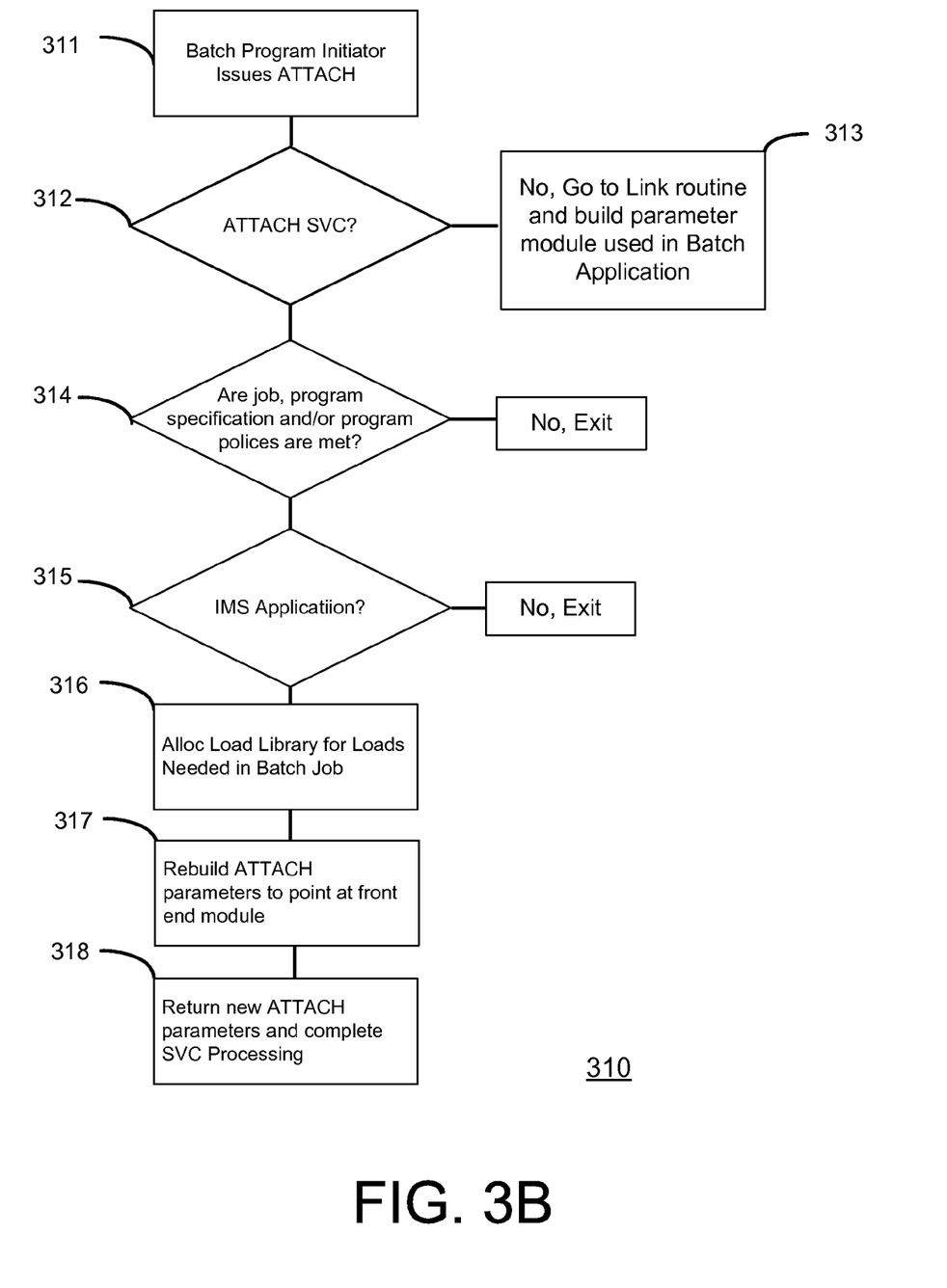
Figure 3C:
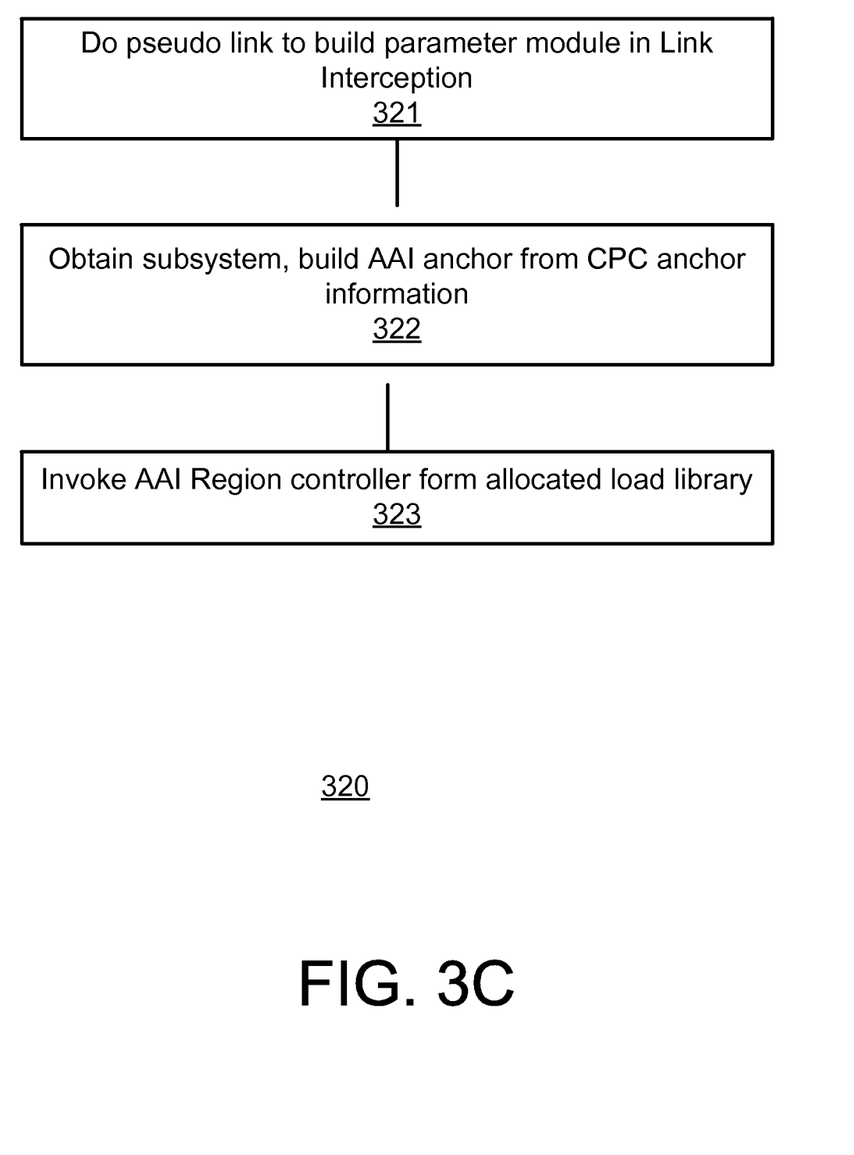

FIG. 3B shows an example SVC intercept routine 310 which, for example, may be set up by method 300/302. SVC intercept routine 310 may begin when a batch program initiator issues an ATTACH SVC call (311). SVC intercept routine 310 may involve attaching an alternate module, if it is an ATTACH SVC (312). If it is not an ATTACH SVC (313) but an SVC LINK of a specific module by the batch application, a parameter module is built for use in the batch application (FIG. 3C). In the instance an ATTACH SVC is issued 311, SVC intercept routine 310 next involves determining if certain conditions are met, for example, if job, program specification and/or program polices are met (314) and if the batch application is an IMS application (315). If both conditions are met, the SVC intercept routine 310 may involve allocating a load library for loads needed in the batch job (316), rebuilding ATTACH parameters to point at a front end module (317), and returning new ATTACH parameters and completing SVC processing (318).

FIG. 3C shows an example process 320 by the IMS application (e.g., user application 150) for invoking AAI 210. Process 320 may include, at the CPC front end processor, doing a pseudo link to build a parameter module in link interception (321), obtaining subsystem and build AAI anchor from CPC anchor information (322), and invoking AAI 210 controller from allocated load library (323).

Figure 3D:
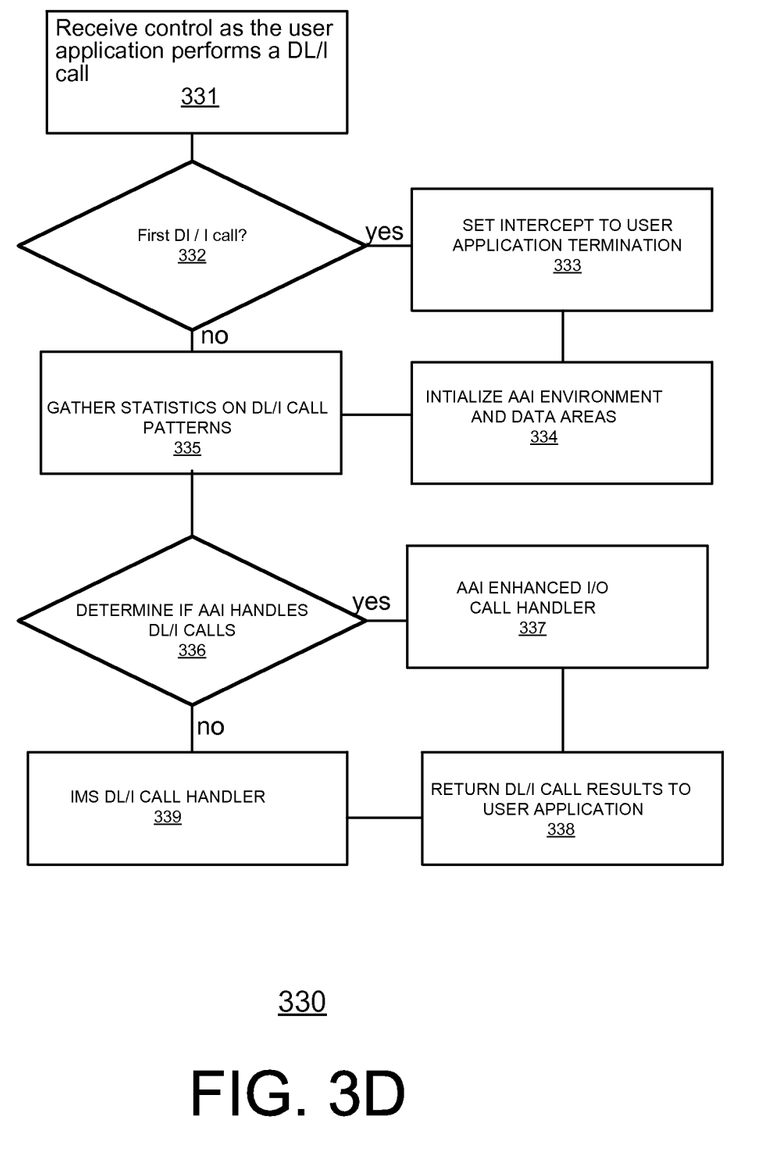

FIG. 3D shows an example process 330 for DL/I call interception initiation and capture by AAI 210/AAI DL/I intercept component 220 when the IMS application makes DL/I calls for a batch job. Process 330 may include receiving control by AAI 210/AAI DL/I intercept component 220 as the user application performs a DL/I call (331) and determining if it is a first DL/I call (332). If no, method 330 includes gathering statistics on DL/I call patterns (335). If yes, method 330 includes setting intercept to user application termination (333) and initializing AAI environment and data areas (334) before gathering statistics on DL/I call patterns 335. Next, process 300 includes determining which component handles the DL/I call (336) and accordingly letting the IMS DL/I component handle the call (339) or letting the AAI Enhanced I/O caller (e.g., AAI DL/I intercept component 220) handle the call (337). In either case process 330 includes returning DL/I call results to the user application (338).

Figure 3E:
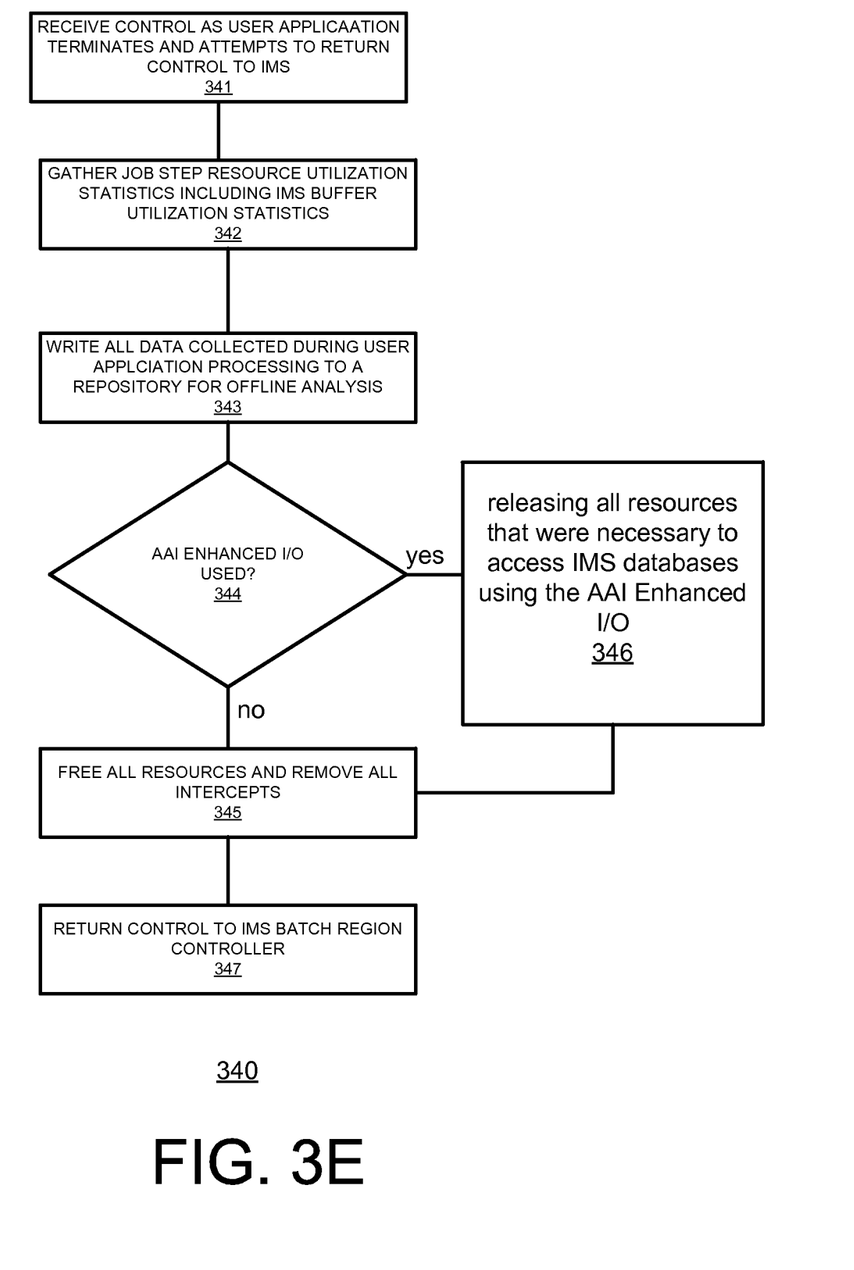

FIG. 3E shows an example process 340 for termination of DL/I call interception by AAI 210/AAI DL/I intercept component 220. Process 340 may include receiving control as the user application terminates and attempts to return control to IMS (341), gathering job step resource utilization statistics including IMS buffer utilization statistics (342), and writing all data collected during user application processing to a repository for further analysis (343). Next, process 340 may include determining if AAI Enhanced I/O caller (e.g., AAI DL/I intercept component 220) was used (344). If no, process 340 may include freeing all resources and removing all intercepts (345). If yes, process 340 may also include releasing all resources that were necessary to access IMS databases using the AAI Enhanced I/O caller (346) before returning control to the IMS batch region controller (347).

IMS Batch Message Processing (BMP) DL/I Application

Figure 4:
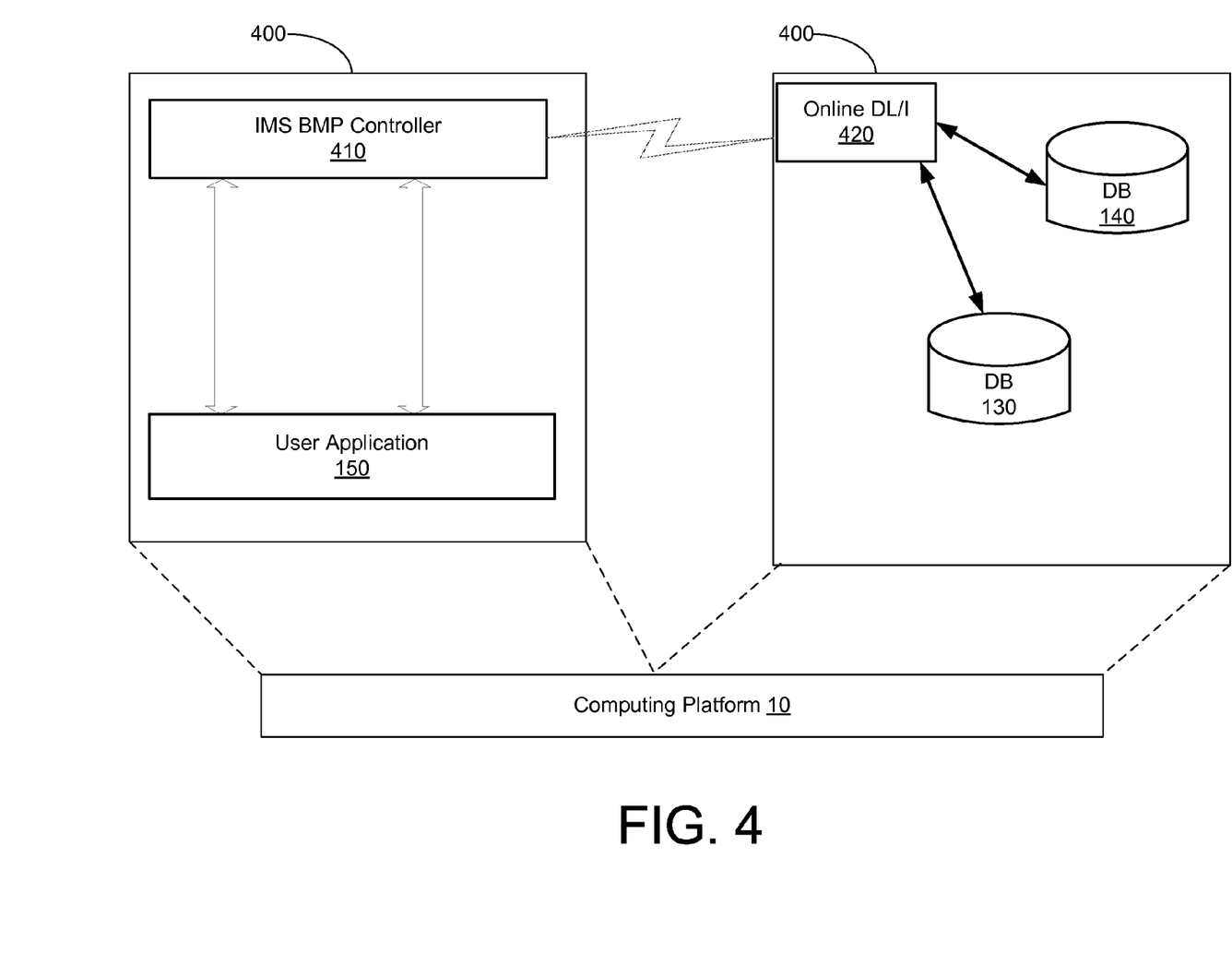
FIG. 4 is a block diagram illustrating a conventional IMS arrangement hosted on a computing platform (e.g., a MVS environment) for batch message processing (BMP) applications.

FIG. 4 shows a conventional IMS arrangement 400 hosted on a computing platform 10 (e.g., a MVS environment) for batch message processing (BMP) applications. Batch message processing programs (BMPs) are application programs that perform batch type processing online and can access databases controlled by DBCTL.

Batch Message Processing (BMP) IMS DL/I applications may differ from Batch IMS Applications only in their respective methods of data access. Unlike the IMS Batch DL/I application's data access path, IMS DL/I calls in BMP are communicated to a separate IMS address space that is responsible for handling all IMS database access for parallel application processing. The IMS batch region controller connects to an online IMS region and then passes control to the user's application program. The user's application program makes DL/I calls to read and write data. The DL/I calls are passed to the IMS online region, which performs the actual IO and sends the data back to the application. The additional requirement for cross address space communication, the serialization and record locking associated to data access can significantly impact database access times.

The same program (e.g., user application 150) may be run as a BMP program or as a batch program. In arrangement 400, as shown in FIG. 4, a standard IMS online DL/I interface 420 is used for online batch message processing instead of the standard IMS DL/I interface 120 used in arrangement 100 for batch processing. The same IMS batch processing controller 110 used in arrangement 100 may be used in arrangement 400. In FIG. 4, IMS batch processing controller 110 is renamed as IMS BMP processing controller 410 for convenience in description herein.

When user application 150 is executed, a job step may specify BMP DL/I processing (e.g., in job control language (JCL)). In response, MVS may pass control (e.g., via a Supervisor Call (SVC)) to IMS BMP controller 410, which may create a limited IMS environment and a communication connection to IMS controller 410's BMP address space.

IMS may pass control to user application 150, which upon receiving control may initialize and begins processing. When user application 150 makes a data access request (i.e., a DL/I call to read/write an IMS database) control may be passed back to IMS. IMS code in the BMP address space may format the application's DL/I request into a message to be sent to the IMS online DL/I control region (e.g., Online DL/I 420). The message may be sent, for example, via the established communication link, to provide the user application's DL/I call request to the IMS online DL/I control region. The IMS online DL/I control region may process the message to extract the user application's DL/I call, and further access an appropriate IMS database (e.g., database 130 or 140) as per parameters provided in the DL/I call request. The IMS online control region may then format a return message to return data results and call status via the communication link to the BMP region of IMS BMP controller 410, which may then forward them to user application 150. User application 150 may make additional database requests several times before it completes its tasks. User application 150 may then terminate and pass control back to the IMS batch region controller. The IMS batch region controller may terminate the IMS environment as the BMP job completes.

It may be expected that due to the longer code path associated with DL/I calls in a BMP region, database access performance may be significantly slower than standard IMS DL/I Batch database access.

IMS BMP DL/I Application with Application Accelerator

Figure 5:
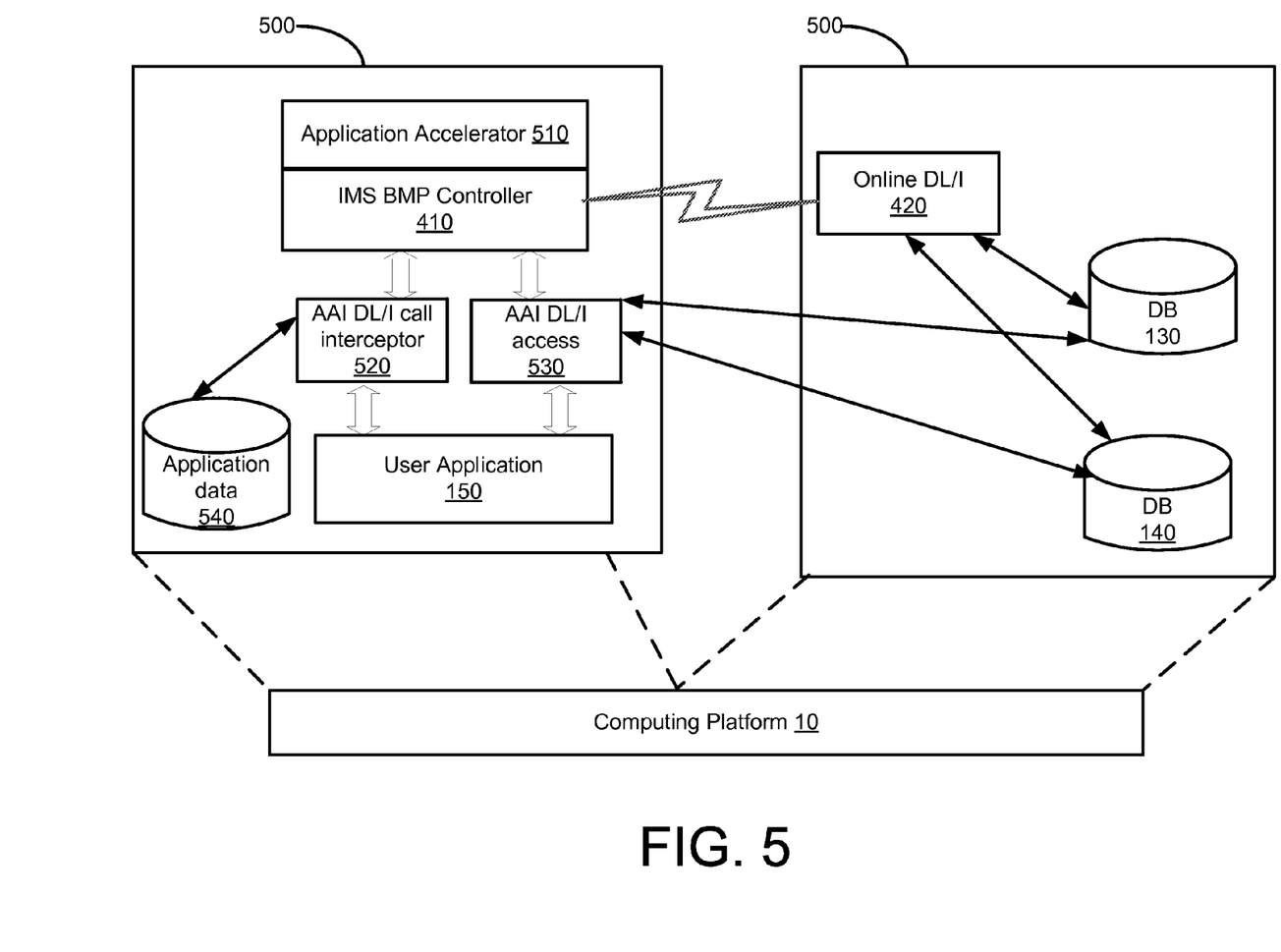
FIG. 5 is a block diagram illustrating an IMS arrangement, which includes a specialized batch message processing (BMP) region controller or database access engine (e.g., Application Accelerator for IMS), in accordance with the principles of the disclosure herein.

FIG. 5 shows an IMS arrangement 500, which in addition to the components of IMS arrangement 400 includes a specialized BMP region controller or database access engine (e.g., Application Accelerator for IMS (AAI) 510), in accordance with the principles of the disclosure herein. AAI 510 may be configured to make alternate data access paths in addition to the standard IMS DL/I data access paths available to an IMS application (e.g., user application 150).

The specialized BMP region controller (e.g., AAI 510), which may be installed as front end to the IMS BMP region controller 410, may be configured to self-determine if it should be involved in IMS DL/I calls processing and to install a BMP call interceptor (e.g., AAI call interceptor 520) and BMP access interceptor (e.g., AAI call access 530) if appropriate. Control may then be passed to IMS, which may then initialize the IMS BMP environment and establish communication links with the online control region. IMS may then pass control to what IMS assumes to be the application program. The BMP call interceptor may get control, initialize, prepare to gather data and intercept IMS DL/I calls. In application runtime, the IMS DL/I application (e.g., user application 150) may issue a DL/I call to access an IMS database. The DL/I call may be routed to the specialized BMP region controller, which may examine the DL/I call and determine if the DL/I call is one it should process. If it encounters an incompatible DL/I call, the specialized BMP region controller may perform dynamic disengagement by restoring a previous normal IMS DL/I position and passing the incompatible DL/I call and all further calls of the same type to the IMS DL/I access path in the IMS online control region. At IMS shutdown, BMP call interceptor may get control, save runtime data gathered in the job step processed, terminate, and pass control to the IMS termination.

With reference to IMS arrangement 500 in FIG. 2, AAI 510 may be initialized on an IBM MVS image (e.g., computing platform 10) as a dynamic front-end to IMS BMP controller 110. A job step in application 150 may specify BMP DL/I processing in the JCL. In response, MVS, as in arrangement 400 (FIG. 4), may intend to pass control to IMS BMP controller 410, which here has AAI 510 as a front-end. AAI 510 may be configured to evaluate the job step and data (e.g., application data, call pattern data, etc. stored in application database 540) to determine whether the alternate or additional data access paths to IMS Online DL/I 420 would, for example, be beneficial or appropriate for application processing of the job step. AAI 510 may be configured to accordingly install one or more enhanced I/O components (e.g., AAI DL/I call intercept component 520 and AAI DL/I access intercept component 530) for the alternate or additional data access paths. The alternate or additional data access paths may be optimized to improve user application 150's IMS database access (e.g., to databases 130 and 140).

IMS BMP controller 410 may create a limited IMS environment and a communication connection to the IMS control region address space. IMS may pass control to AAI DL/I call intercept component 520, which may get control and establish a necessary environment for processing DL/I calls. Control may then be passed to the user application (e.g., user application 150). User application 150 may receive control, initialize and begin processing. When user application 150 makes a DL/I call to read/write an IMS database, control may be passed to AAI DL/I call access component 530. AAI 510 may determine which component should process the user application's DL/I call.

If IMS Online DL/I 420 should process the call, AAI DL/I call access component 530 passes control to IMS Online DL/I 420. IMS code in the BMP address space may format the user application's DL/I call request into a message to be sent to IMS Online DL/I 420 via the established communication link and provide the IMS control region with the user application's DL/I call request. IMS Online DL/I 420 may process the received message to extract the user application's DL/I call and access an appropriate IMS database (e.g., database 130 or 140) as per parameters included in the user application's DL/I call. IMS Online DL/I 420 may format a message to return the DL/I call results and call status via the established communication link to IMS BMP controller 410, which may forward the DL/I call results and call status to AAI DL/I call intercept component 520. AAI 510 may monitor call results from IMS Online DL/I 420 and return the DL/I call results and call status to user application 150 for further processing.

If AAI 510 should process the call, AAI DL/I call access component 530 may be called to perform data I/O operations by accessing an appropriate IMS database (e.g., database 130 or 140) as per parameters included in the user application's DL/I call. AAI 510 may return the data and call status results to user application 150 for further processing.

User application 150 may make additional database requests several times before it completes its tasks in a BMP job. User application 150 may then terminate and pass control back to the IMS BMP controller 410. IMS BMP controller 410 may terminate the IMS environment upon completion of the BMP job.

AAI 510 may be installed as a front end to IMS's BMP region controller in an MVS/IMS environment in the same manner as AAI 210 using, for example, methods 300 and 310

(or similar methods) that were described with reference to FIGS. 3A and 3B in the foregoing.

AAI Dynamic Disengagement

As noted previously, the Application Accelerators described herein (e.g., AAI 210 and AAI 510) may be configured to self-determine when to get involved in processing a DL/I call made by an IMS application. The Application Accelerators may be configured to process the DL/I calls of only a certain type or only when the current job meets certain criteria. One criterion may be that the job historically has made only DL/I calls of the type that the Application Accelerator's DL/I access or I/O engine can simulate. This criterion may, for example, limit the calls to 'Get' function codes (GU, GN, GHU, GHN . . . ) that do not use Boolean operators in Segment Search Arguments (SSAs). A job meeting the criteria for involvement may have been intercepted by an Application Accelerator for processing. However, during the processing of the job, the user application may attempt an "incompatible" call that the AAI DL/I access engine cannot process. In such instance, the AAI DL/I access engine may perform a Dynamic Disengagement process.

In the Dynamic Disengagement process, the AAI DL/I access engine may call the IMS DL/I access interface (e.g., IMS DL/I interface 120) to reestablish process conditions (e.g., database position and parentage) that existed prior to the incompatible call. The AAI DL/I access engine may further pass the current incompatible call to IMS for processing and sets flags so that all AAI intercepts are removed and all subsequent calls in the job are passed directly to the IMS interface.

An Unload API may be deployed in the AAI DL/I access engine to reestablish prior process conditions and to ensure that IMS has the correct environment to process future calls.

To reestablish the prior process conditions, the AAI DL/I access engine may maintain a running record of the process conditions. For example, the AAI DL/I access engine may save an incompatible or unsuccessful call by copying all SSAs and the call function to a SSA table. Any subsequent unsuccessful calls may also be saved to the SSA table until a successful call is made, at which point the table may be cleared. Further, after each successful call, the Unload API may save the Relative Byte Address (RBA) of the segment at the current position in the database. It may also save the RBAs of all the segments in the hierarchical path to the root segment. In addition, the AAI DL/I access engine may save a key of the root segment and set a flag indicating the level at which parentage of the database is currently set. Finally, the Unload API may clear the table that holds the SSAs for the unsuccessful calls.

The AAI DL/I access engine may disengage by making a series of calls to the IMS DL/I data access interface. The calls may, for example, involve:

Reading the root segment from the last successful call using the root key. This ensures that HALDB databases are positioned in the correct partition.

Reading each lower level segment from the last successful call using the 'T' command code (read using the segment's RBA).

When positioning at a level lower than where parentage is to be set, the AAI DL/I access engine may use the 'GNP' (Get Next within Parent) function.

Once the AAI DL/I access engine has re-established the database position and parentage from the last successful call, it may call IMS for each unsuccessful call using the function and SSAs that have been saved in the SSA table.

Figure 6:
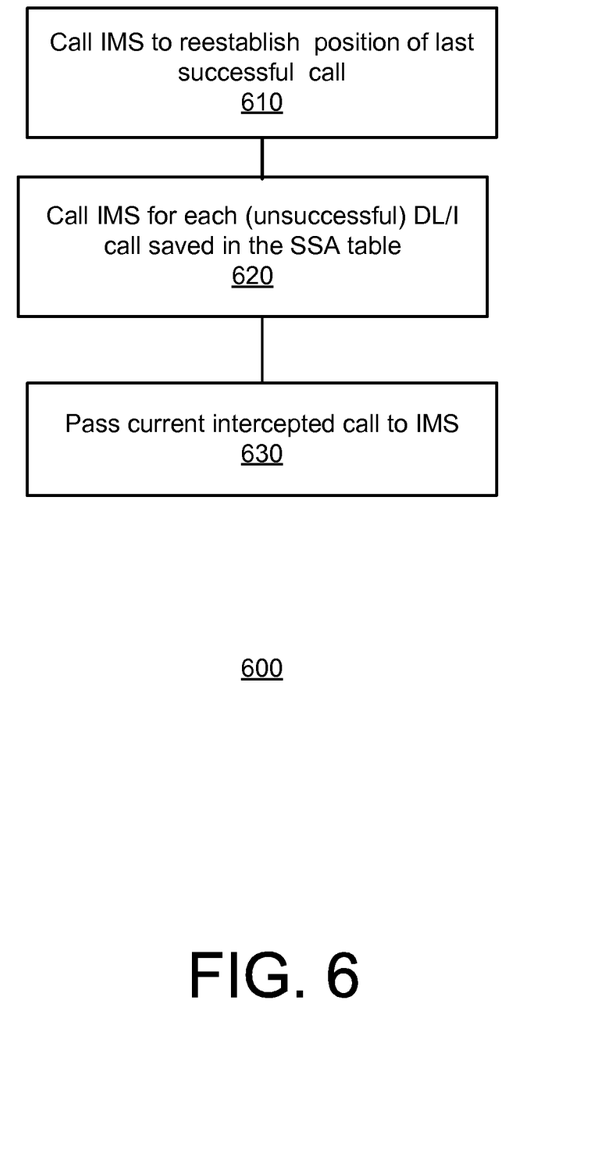
FIG. 6 shows an example method, which the database access engine of FIG. 1 may use to disengage from involvement in processing application calls, in accordance with the principles of the disclosure herein.

FIG. 6 shows an example method 600 which the AAI DL/I access engine may use to disengage from involvement in processing application calls, in accordance with the principles of the disclosure herein. Method 600 includes calling IMS to reestablish position of last successful call (610), calling IMS for each (unsuccessful) DL/I call saved in the SSA table (620), and passing the current intercepted call to IMS (630).

Figure 7:
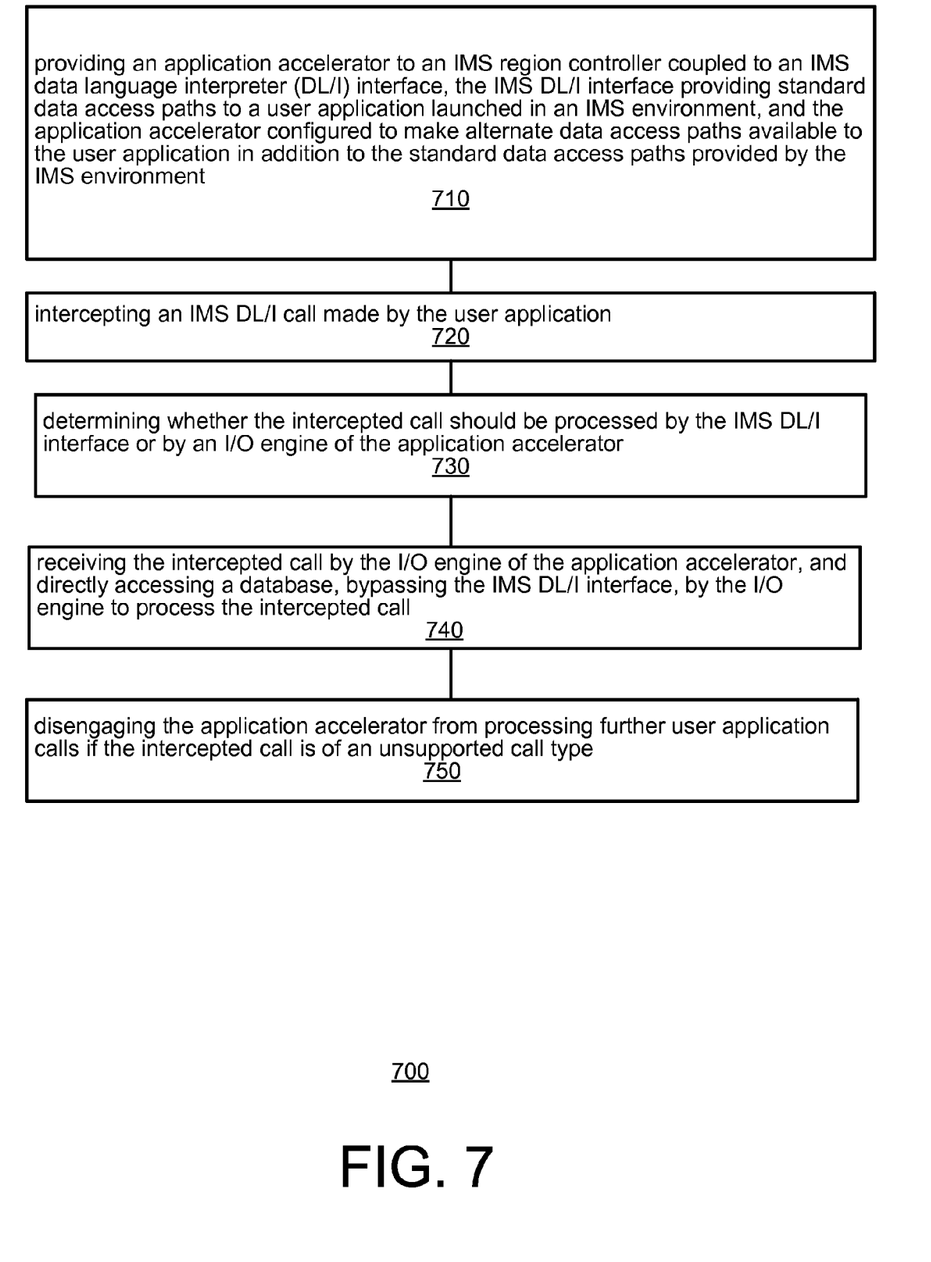
FIG. 7 is a flow chart illustrating an example method 700 for enhancing data access by a user application in an IMS environment, in accordance with the principles of eth disclosure herein.

FIG. 7 is a flow chart illustrating an example method 700 for enhancing data access by a user application in an IMS environment, in accordance with the principles of eth disclosure herein.

Method 700 includes providing an application accelerator to an IMS region controller coupled to an IMS data language interpreter (DL/I) interface (710). The IMS DL/I interface may provide standard data access paths to the user application launched in an IMS environment, and the application accelerator may be configured to make alternate data access paths available to the user application in addition to the standard data access paths provided by the IMS environment.

Method 700 further includes intercepting an IMS DL/I call made by the user application (720), and determining whether the intercepted call should be processed by the IMS DL/I interface or by an I/O engine of the application accelerator (730). Determining whether the intercepted call should be processed by the IMS DL/I interface or by the I/O engine of the application accelerator may include determining based on analysis of at least one of previous call data results, application data, call pattern data, and/or call status information.

Method 700 may further include receiving the intercepted call by the I/O engine of the application accelerator and directly accessing a database, bypassing the IMS DL/I interface, by the I/O engine to process the intercepted call (740). Method 700 may also include monitoring, collecting, and analyzing data results and/or call status information returned by either the IMS DL/I interface or the I/O engine of the application accelerator.

Method 700 may also include disengaging the application accelerator from processing further user application calls if the intercepted call is of an unsupported call type (750). Disengaging the application accelerator may involve restoring IMS processing conditions to that existing prior to the intercepted call of the unsupported call type.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including instructions stored on a non-transitory computer readable storage medium and executable by at least one processor, the system comprising:
    an information management system (IMS) region controller coupled to a IMS data language interpreter (DL/I) interface, the IMS DL/I interface providing standard data access paths to a user application launched in an IMS environment; and
    an application accelerator configured to make alternate data access paths available to the user application in addition to the standard data access paths provided by the IMS environment,
    the application accelerator being configured evaluate a job run by the user application and determine if the application accelerator should be involved in processing IMS DL/I calls made by the user application based on analysis of at least one of previous call data results, application data, call pattern data, and/or call status information.

2. The system of claim 1, wherein the application accelerator includes an I/O engine configured to receive a data access request from the user application and directly access a database, bypassing the IMS DL/I interface, to fulfill the data access request.

3. The system of claim 1, wherein the application accelerator is configured to intercept an IMS DL/I call made by the user application and determine whether the intercepted call should be processed by the IMS DL/I interface or by an I/O engine of the application accelerator.

4. The system of claim 3, wherein the application accelerator is configured to monitor, collect, and analyze data results and/or call status information returned by either the IMS DL/I interface or the I/O engine of the application accelerator.

5. The system of claim 3, wherein the application accelerator is configured to support processing of user application calls of a certain type, and is further configured to disengage from intercepting user application calls after intercepting or encountering an unsupported call type.

6. The system of claim 1, wherein the IMS DL/I interface is an online DL/I interface for batch message processing.

7. The system of claim 3, wherein the application accelerator is further configured to restore IMS processing conditions to that existing prior to the intercepted call of the unsupported call type.

8. The system of claim 1, wherein the application accelerator is configured to dynamically gather data in the execution of the user application, analyze application performance, and accordingly adjust or change the application execution environment.

9. The system of claim 8, wherein the application accelerator is configured to adjust or change the application execution environment by one or more of altering buffers sizes, altering a number of buffers allocated based on actual IMS database access calls and buffer hit ratios, and dynamic use of sequential buffering.

10. A method comprising:
    providing an application accelerator to an IMS region controller coupled to a IMS data language interpreter (DL/I) interface, the IMS DL/I interface providing standard data access paths to a user application launched in an IMS environment, and the application accelerator configured to make alternate data access paths available to the user application in addition to the standard data access paths provided by the IMS environment;
    intercepting an IMS DL/I call made by the user application; and
    determining whether the intercepted call should be processed by the IMS DL/I interface or by an I/O engine of the application accelerator based on analysis of at least one of previous call data results, application data, call pattern data, and/or call status information.

11. The method of claim 10, further comprising:
    receiving the intercepted call by the I/O engine of the application accelerator; and directly accessing a database, bypassing the IMS DL/I interface, by the I/O engine to process the intercepted call.

12. The method of claim 10, further comprising:
monitoring, collecting, and analyzing data results and/or call status information returned by either the IMS DL/I interface or the I/O engine of the application accelerator.

13. The method of claim 10, wherein the application accelerator is configured to support processing of user application calls of a certain type, and wherein the method further comprises:
disengaging the application accelerator from processing further user application calls if the intercepted call is of an unsupported call type.

14. The method of claim 13, wherein disengaging the application accelerator from processing further user application calls if the intercepted call is of an unsupported call type includes:
restoring IMS processing conditions to that existing prior to the intercepted call is of the unsupported call type.

15. The method of claim 10 further comprising dynamically gathering data in the execution of the user application, analyzing application performance, and accordingly adjusting or changing the application execution environment by one or more of altering buffers sizes, altering a number of buffers allocated based on actual IMS database access calls and buffer hit ratios, and dynamic use of sequential buffering.

16. A computer program product including executable instructions recorded on a non-transitory computer readable storage medium, which instructions when executed cause at least one processor to:
provide an application accelerator to an IMS region controller coupled to a IMS data language interpreter (DL/I) interface, the IMS DL/I interface providing standard data access paths to a user application launched in an IMS environment, and the application accelerator configured to make alternate data access paths available to the user application in addition to the standard data access paths provided by the IMS environment;
intercept an IMS DL/I call made by the user application; and
determine whether the intercepted call should be processed by the IMS DL/I interface or by an I/O engine of the application accelerator based on analysis of at least one of previous call data results, application data, call pattern data, and/or call status information.

17. The computer program product of claim 16, wherein the instructions when executed cause the I/O engine of the application accelerator to:
receive the intercepted call; and
directly access a database, bypassing the IMS DL/I interface, to process the intercepted call.

18. The computer program product of claim 16, wherein the instructions when executed cause the application accelerator to:
monitor, collect, and analyze data results and/or call status information returned by either the IMS DL/I interface or the I/O engine of the application accelerator.

19. The computer program product of claim 16, wherein the application accelerator is configured to support processing of user application calls of a certain type, and wherein the instructions when executed cause the application accelerator to:
disengage from processing further user application calls if the intercepted call is of an unsupported call type.

20. The computer program product of claim 19, wherein the instructions when executed cause the application accelerator to:
restore IMS processing conditions to that existing prior to the intercepted call of the unsupported call type.

* * * * *

UNITED STATES PATENT AND TRADEMARK OFFICE
CERTIFICATE OF CORRECTION

PATENT NO. : 9,098,557 B2  
APPLICATION NO. : 13/789542  
DATED : August 4, 2015  
INVENTOR(S) : Bruce H. Mansur et al.

Page 1 of 1

It is certified that error appears in the above-identified patent and that said Letters Patent is hereby corrected as shown below:

Claims

In column 12, line 5, in claim 1, after "configured" insert -- to --.

In column 13, line 20, in claim 14, delete "is of the" and insert -- of the --, therefor.

Signed and Sealed this
Twenty-sixth Day of January, 2016

Michelle K. Lee
*Director of the United States Patent and Trademark Office*